United States Patent
Priddy

(10) Patent No.: US 10,122,631 B1
(45) Date of Patent: Nov. 6, 2018

(54) SYSTEMS AND METHODS FOR PRIORITIZING PACKETS

(71) Applicant: ADTRAN, Inc., Huntsville, AL (US)

(72) Inventor: Brent Christopher Priddy, Harvest, AL (US)

(73) Assignee: ADTRAN, Inc., Huntsville, AL (US)

( * ) Notice: Subject to any disclaimer, the term of this patent is extended or adjusted under 35 U.S.C. 154(b) by 116 days.

(21) Appl. No.: 15/148,462

(22) Filed: May 6, 2016

(51) Int. Cl.
*H04L 12/28* (2006.01)
*H04L 12/741* (2013.01)
*H04L 12/721* (2013.01)
*H04L 29/12* (2006.01)
*H04L 12/26* (2006.01)

(52) U.S. Cl.
CPC ............ *H04L 45/745* (2013.01); *H04L 43/16* (2013.01); *H04L 45/66* (2013.01); *H04L 61/103* (2013.01); *H04L 61/6022* (2013.01)

(58) Field of Classification Search
CPC .................................................... H04L 45/745
See application file for complete search history.

(56) References Cited

U.S. PATENT DOCUMENTS

| 7,215,637 | B1 * | 5/2007 | Ferguson | ................ | H04L 45/00 370/230.1 |
| 7,693,158 | B1 * | 4/2010 | Carrie | ................. | H04L 12/4641 370/395.53 |
| 2017/0041223 | A1 * | 2/2017 | Akashi | .................... | H04L 45/66 |
| 2017/0164386 | A1 * | 6/2017 | Fu | ..................... | H04W 72/1247 |

* cited by examiner

*Primary Examiner* — Afshawn M Towfighi
(74) *Attorney, Agent, or Firm* — Maynard Cooper & Gale, P.C.; Jon E. Holland

(57) ABSTRACT

A system and method is provided for prioritizing packets at an Ethernet interface of a network device based on the destination MAC address in the packets. The Ethernet interface has a MAC table that lists the MAC addresses that can be accepted by the Ethernet interface. The MAC table can include one or more MAC addresses associated with low priority packets and one or more MAC addresses associated with high priority packets. When conditions at the network device exceed a threshold, the MAC table can be updated to disable or delete the MAC addresses associated with the low priority packets. By disabling the MAC addresses for low priority packets, only the MAC addresses associated with high priority packets remain in the MAC table, thereby enabling only high priority packets to be recognized and passed by the Ethernet interface to the CPU.

23 Claims, 4 Drawing Sheets

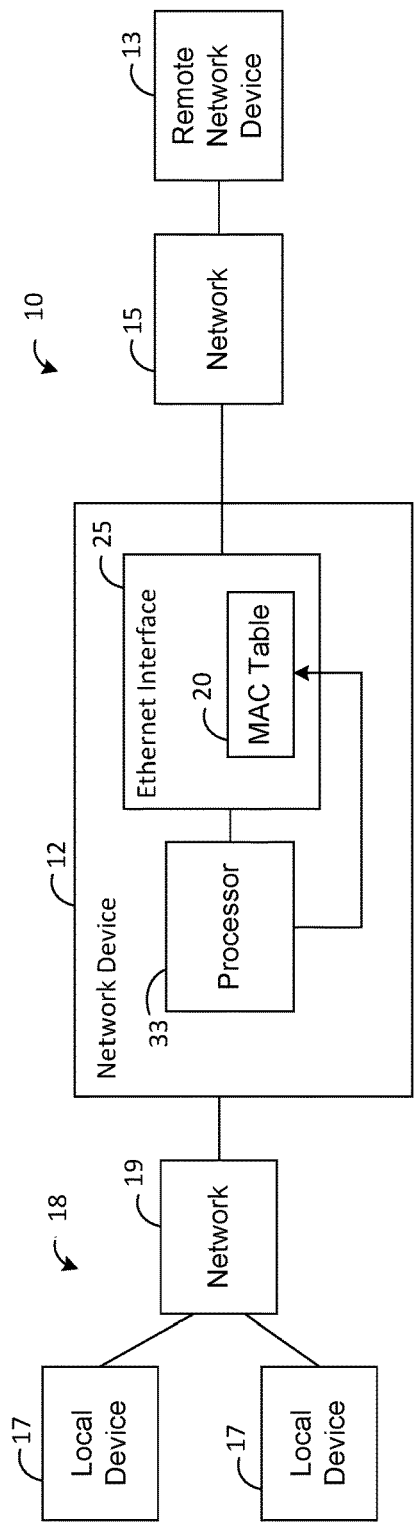
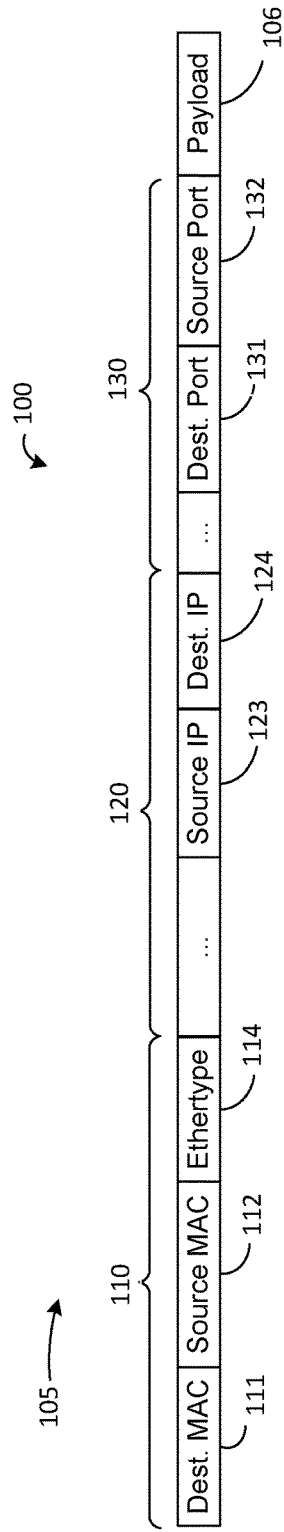
FIG. 1
FIG. 4

SYSTEMS AND METHODS FOR PRIORITIZING PACKETS

BACKGROUND

The present application generally relates to systems and methods for prioritizing packets using the destination media access control (MAC) address from the packet.

The central processing unit (CPU) of a network device, such as a computer, router or Level 3 (L3) switch, can become burdened when the network device receives too much traffic (e.g., packets), such as in a denial of service (DoS) attack, or when the network device receives complicated traffic that requires extra processing by the CPU. When the CPU is burdened with too much traffic or complicated traffic, the CPU may not be able to process all of the traffic being sent to the network device, which may result in indiscriminate dropping of the traffic by the CPU, i.e., the CPU does not know what traffic is being discarded or not processed by the CPU. For instance, service providers or network administrators would like the ability to access the network device being burdened with too much traffic or complicated traffic to debug and modify the configuration of the network device to relieve the burden on the CPU.

One way to respond to a network device being burdened is to prioritize management or other high priority traffic, such as Telnet or Secure Shell (SSH) traffic, over the other traffic that may be causing the high CPU burden to permit the network device to respond to the management traffic. Many solutions to the burdened CPU problem involve the use of input quality of service (QOS) techniques in the receiving hardware to classify and queue traffic (in multiple ingress queues) before providing the prioritized traffic to the CPU. However, many network devices do not have Ethernet interfaces with QOS functionality in hardware to classify and prioritize "management traffic" over other traffic which might be bogging down the CPU.

SUMMARY

The present application generally pertains to systems and methods for prioritizing traffic, e.g., packets, at an Ethernet interface of a network device based on the destination media access control (MAC) address in the packets. The Ethernet interface has a MAC table that lists the destination MAC addresses that can be accepted by the Ethernet interface. The MAC table can include one or more MAC addresses associated with "general" traffic and one or more MAC addresses associated with "prioritized" or "management" traffic. When the CPU of the network device becomes burdened or congested, the MAC table can be updated to disable or delete the MAC addresses associated with "general" traffic. By disabling the MAC addresses for "general" traffic, only the MAC addresses associated with "prioritized" traffic remain identifiable in the MAC table, thereby enabling only "prioritized" traffic to be recognized and passed by the Ethernet interface to the CPU. Once the burden on the CPU subsides, the MAC table can be updated to enable or add the MAC addresses associated with "general" traffic that were previously disabled, thereby enabling "general" traffic to be recognized and passed by the Ethernet interface to the CPU.

One advantage of the present application is that traffic prioritization can be performed on any Ethernet interface using a MAC table.

Another advantage of the present application is to be able to prioritize management Ethernet traffic for an Ethernet device under attack or receiving Ethernet packets causing high CPU utilization.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

FIG. 1 is a block diagram showing an embodiment of a communication system.

FIG. 4 is a schematic diagram showing an embodiment of a frame communicated to the network device.

Wherever possible, the same reference numbers are used throughout the drawings to refer to the same or like parts.

DETAILED DESCRIPTION

Figure 2:
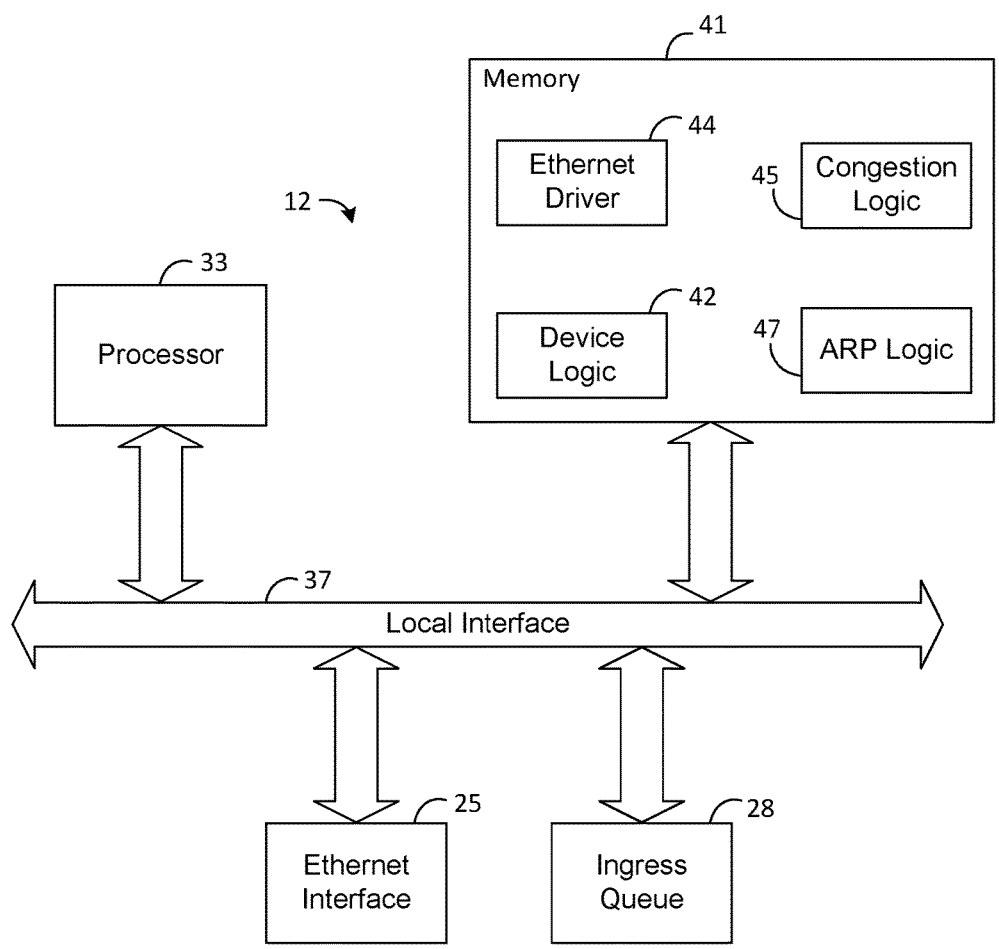
FIG. 2 is a block diagram showing an embodiment of the network device of FIG. 1.

The present application generally pertains to systems and methods for prioritizing packets received at a network device, such as an Ethernet device, in response to certain conditions, e.g., congestion, occurring at the network device. The prioritization of packets occurs by controlling the MAC addresses in the MAC table of the network device. If the conditions at the network device become congested or unacceptable, one or more MAC addresses in the MAC table can be disabled; thereby preventing the network device from recognizing those packets that are using one of the disabled MAC addresses as their destination MAC address. The disabling of a MAC address can involve either the removal of the MAC address from the MAC table or the "flagging" of the MAC address in the MAC table such that the "flagged" MAC address is not identifiable or considered a valid address by a classifier parsing the MAC table. The disabled MAC addresses in the MAC table can be associated with packets from other network devices that are considered to be transmitting lower priority or "general" traffic by the network device. The remaining MAC addresses in the MAC table, i.e., the MAC addresses that are not disabled, can be associated with packets from other network devices that are considered to be transmitting higher priority traffic, for example, "management" traffic, by the network device. The prioritization of packets occurs from the continued recognition of packets using destination MAC addresses that remain in the MAC table over those packets that were previously recognized by the network device but are no longer being recognized by the network device because the destination MAC addresses used by those other packets that are no longer being recognized have been disabled in the MAC table.

The network device can have an initial MAC address that identifies the network device and is assigned to the device when the device is manufactured. In addition, the network device can be provided with an initial Internet Protocol (IP) address. In one embodiment, the initial IP address can be mapped to the initial MAC address during an address resolution protocol (ARP) process. During the ARP process, the network device can generate an ARP reply that includes the initial MAC address identifying the network device in response to receiving an ARP request from a remote network device that used the initial IP address of the network device as the destination address in the ARP request. After completing the ARP process, when the network device receives a packet with the initial IP address as a destination IP address, the network device can parse the header of the packet to obtain the destination MAC address included the packet, which can be the initial MAC address. The network device then compares the destination MAC address, e.g., the initial MAC address, included in the packet to the MAC addresses in the MAC table. If there is a match, the packet is forwarded to the CPU of the network device for further processing. In order to implement the prioritization scheme of the present application, one or more "additional" IP addresses can be associated with the network device, which additional IP addresses can then be mapped to corresponding "priority" MAC addresses for the network device during the ARP process such that the use of an additional IP address in an ARP request results in an ARP reply with the priority MAC address. The priority MAC addresses can then be included in the MAC table for the network device and used to recognize incoming packets using the priority MAC address(es) in the destination MAC address. When the network device becomes congested, the network device can disable the initial MAC address in the MAC table while keeping the priority MAC address(es) in the MAC table to thereby provide priority to those packets having the priority MAC address(es) as a destination MAC address.

FIG. 1 shows an embodiment of a communication system 10. The communication system 10 includes a network device 12, such as a server, router or switch, and a remote network device 13 that are both coupled to and communicate via a network 15. In one embodiment, the network 15 is the Internet configured to communicate frames in accordance with Internet Protocols. In another embodiment, the network 15 is an Ethernet network configured to communicate frames in accordance with Ethernet protocols, but other types of networks using other types of protocols are possible in still other embodiments.

The network device 12 can operate as a gateway device for a private network 18. For example, the network device 12 can be connected to one or more local devices 17 via a network 19 to form the private network 18. The outgoing traffic from the local devices 17 may pass through the network device 12 before reaching network 15 and remote network devices 13. Similarly, incoming traffic from the remote network devices 13 and network 15 may first pass through network device 12 before reaching a local device 17. The network device 12 and the local devices 17 can each have private addresses (including private MAC addresses) that identify the devices on the private network 18. The private addresses assigned to the network device 12 and the local devices 17 can be used for communicating over the private network 18. The network device 12 can also have a set of public addresses (which may be different from the private addresses) that identify the network device 12 to the remote network devices 13 connected on the network 15.

As shown by FIG. 1, the network device 12 has an Ethernet interface 25 coupled to and in communication with a processor 33. The Ethernet interface 25 can accept packets from the network 15 based on the MAC addresses in a MAC table 20. The Ethernet interface 25 can accept packets from the network 15 that have a destination MAC address that matches one of the MAC addresses in the MAC table 20. If the destination MAC address doesn't match the MAC addresses in the MAC table, the Ethernet interface 25 may ignore or drop the packet. The accepted packets can be provided to the processor 33 by the Ethernet interface 25. The processor 33 can then process the packets as required. In addition, the processor 33 can control the operation of the Ethernet interface 25 and, in particular, can enable and disable MAC addresses in the MAC table 20 based on conditions at the network device 12. For example, the processor 33 may disable MAC addresses in the MAC table 20 in response to one or more of CPU (processor 33) utilization, memory utilization or a load on a process exceeding a corresponding threshold.

FIG. 2 shows an embodiment of the network device 12. The network device 12 can include logic 42, referred to herein as "device logic," for generally controlling the operation of the network device 12. The network device 12 also includes logic 44, referred to herein as an "Ethernet driver," to control the operation of the Ethernet interface 25. The Ethernet driver 44 can provide data to and receive data from congestion logic 45 and ARP logic 47 to assist in the control of the Ethernet interface 25. The congestion logic 45 can be used to determine when the network device is "congested" or "over loaded" and thus prioritize the incoming packets to the Ethernet interface to reduce the congestion. The ARP logic 47 can be used to process ARP messages such as ARP requests and ARP replies.

The device logic 42, the Ethernet driver 44, the congestion logic 45 and the ARP logic 47 can be implemented in software, hardware, firmware or any combination thereof. In the network device 12 shown in FIG. 2, the device logic 42, the Ethernet driver 44, the congestion logic 45 and the ARP logic 47 are implemented in software and stored in memory 41 of the network device 12. Note that the device logic 42, the Ethernet driver 44, the congestion logic 45 and the ARP logic 47, when implemented in software, can be stored and transported on any non-transitory computer-readable medium for use by or in connection with an instruction execution apparatus that can fetch and execute instructions. In the context of this document, a "computer-readable medium" can be any means that can contain or store a program for use by or in connection with an instruction execution apparatus.

The network device 12 can include at least one conventional processor 33, which has processing hardware for executing instructions stored in memory 41. As an example, the processor 33 may include a central processing unit (CPU), a digital signal processor (DSP), or a network processor. The processor 33 communicates to and drives the other elements within the network device 12 via a local interface 37, which can include at least one bus. An ingress queue 28 can store packet data from the Ethernet interface 25 for subsequent processing by the processor 33 and/or the Ethernet driver 44.

Figure 3:
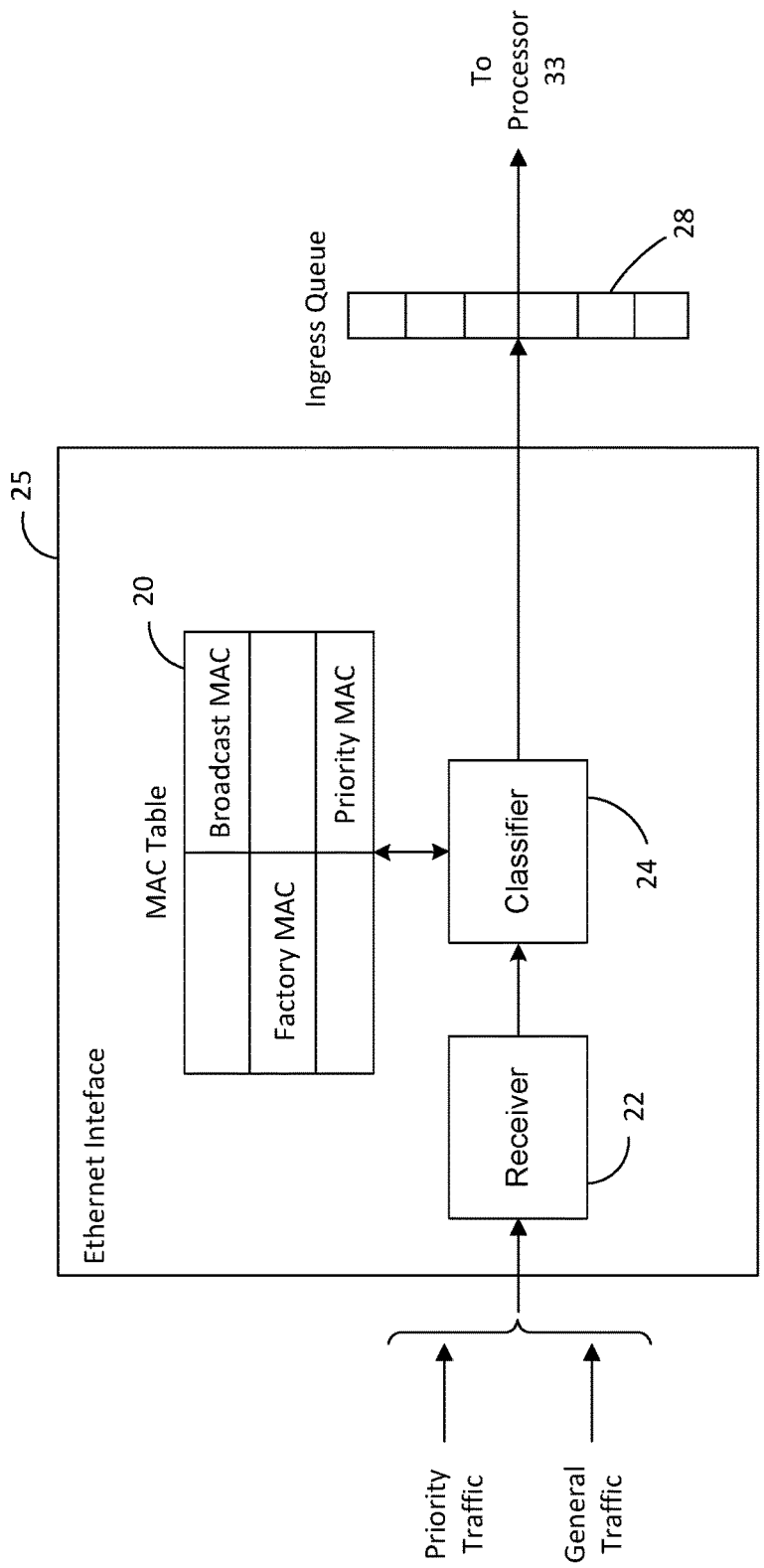
FIG. 3 is a block diagram showing an embodiment of the Ethernet interface of FIG. 1.

FIG. 3 shows an embodiment of the Ethernet interface 25. The Ethernet interface 25 can receive traffic (including "priority" traffic and "general" traffic as shown in FIG. 3) at a receiver 22. In one embodiment, the traffic can include Ethernet packets with embedded IP packets. As known in the art, an Ethernet packet typically includes a preamble and a start frame delimiter followed by an Ethernet frame in accordance with applicable Ethernet protocols. However, in other embodiments, other types of packets may be received.

As an example, FIG. 4 shows an embodiment of a Ethernet frame 100 that can be included within an Ethernet packet received at the Ethernet interface 25. The frame 100 can include a header 105 and a payload 106. The header 105 has overhead information that is used by the network 15 to appropriately forward the message through the network 15, and the payload 106 is typically passed through the network 15 unchanged. The payload 106 is typically intended for the device at the destination IP address or destination MAC address and is not used by the network 15 for forwarding decisions. In the embodiment shown in FIG. 4, the header 105 can include an Ethernet section 110, an IP section 120 and a TCP (transmission control protocol) or UDP (user datagram protocol) section 130. In other embodiments, the header 105 can include additional sections and/or replacement sections to those identified in FIG. 4.

The Ethernet section 110 can include a destination MAC field 111, a source MAC field 112 and an Ethertype field 114. The Ethernet section 110 can include other fields that are not shown for simplicity. The destination MAC field 111 generally indicates the destination MAC address for the packet or, in other words, the MAC address of the device that is destined to receive the packet. The source MAC field 112 generally indicates the source MAC address for the packet or, in other words, the device or the last L3 network element from which the packet originates. The Ethertype field 114 includes various codes defined by Ethernet standards that indicate various attributes about the frame format of the frame 100. The codes generally indicate the type of information that follows the Ethertype field.

The IP section 120 can include can include a destination IP field 124 and a source IP field 123. The IP section 120 can include other fields that are not shown for simplicity. The destination IP field 124 generally indicates the destination IP address for the packet or, in other words, the IP address of the device that is destined to receive the packet. The source IP field 112 generally indicates the source IP address for the packet or, in other words, the device from which the packet originates.

The TCP or UDP section 130 can include can include a destination port field 131 and a source port field 132. The TCP or UDP section 130 can include other fields that are not shown for simplicity. The destination port field 131 generally indicates the port identifier of the service at the device that is to receive the packet. The source port field 132 generally indicates the port identifier of the service at the device that originated the packet.

Referring back to FIG. 3, the receiver 22 can convert analog voltage levels of the packet received from the network 15 to digital data corresponding to the packet. The digital data of the packet is provided to a classifier 24 by the receiver 22. The classifier 24 can parse the preamble of the packet to obtain various packet attributes such as the destination MAC address included in the preamble. The classifier 24 then compares the destination MAC address from the packet to the stored MAC addresses in the MAC table 20. If the destination MAC address from the packet matches one of the stored MAC addresses in MAC table 20, the classifier 24 may send the packet to an ingress queue or buffer descriptor ring 28 to be accessible by the processor 33. In one embodiment as shown in FIG. 3, the ingress queue 28 can be random access memory (RAM) that is separate from the Ethernet interface 25 or memory 41. However, in other embodiments, the ingress queue 28 can be incorporated in Ethernet interface 25 or be a part of memory 41. In still another embodiment, the classifier 24 may send the packet to a DMA (direct memory access) engine (not shown in FIG. 3) that provides the packet to the ingress queue 28.

The MAC table 20 can include a factory MAC address that is preassigned to the network device 12 and specifically identifies the network device 12. In addition, the MAC table 20 can include one or more priority MAC addresses that also specifically identify the network device 12. The one or more priority MAC addresses from the MAC table 20 can be provided to remote network devices 13 that may be sending priority or management packets (corresponding to priority traffic) to the network device 12. In another embodiment, the MAC table 20 can include additional MAC addresses that may not specifically identify the network device 12, but which addresses may be used as the destination MAC address in packets that should be processed by the network device 12. For example, the MAC table 20 may include one or more broadcast MAC addresses, e.g., FF:FF:FF:FF:FF:FF, that can be used as the destination MAC address in broadcast messages transmitted by the remote network devices 13.

A priority MAC address can be generated for use with packets received by the network device 12 that have a higher priority or are considered management packets. In one embodiment, the priority MAC address can be generated by the processor 33 and/or the Ethernet driver 44. In another embodiment, the priority MAC address can be assigned by a user. The priority MAC address can be mapped to a "priority" IP address. The priority IP address can be any IP address that is used to identify the network device 12, including the "initial" IP address assigned to the network device 12 through the DHCP (dynamic host configuration protocol) process. In one embodiment, management packets can be packets that have a destination port field 131 with a port identifier of 80 (corresponding to a web server), 21 (corresponding to ftp (file transfer protocol)), 22 (corresponding to SSH) or 23 (corresponding to Telnet).

The mapping of IP addresses, including the priority IP address and the initial IP address, of the network device 12 to the MAC addresses, including the priority MAC address and the factory MAC address, for the network device 12 can be done during an ARP process. For example, when a remote network device 13 wants to communicate with the network device 12, the remote network device 13 can send out an ARP request with a destination IP address identifying the network device 12 to attempt to learn the MAC address of the network device 12. Upon receiving the ARP request, the ARP logic 47 of the network device 12 can generate an ARP reply for the remote network device 13 with a MAC address that is mapped to the destination IP address for the network device 12 in the ARP request. In other embodiments, the ARP logic 47 can map a MAC address to be included in an ARP reply message based on a source IP address, a source MAC address or both a source IP address and a destination IP address included in the ARP request message.

In one embodiment, the ARP logic 47 can provide the factory MAC address in an ARP reply that is generated in response to an ARP request sent to the initial IP address for the network device 12 and can provide the priority MAC address in an ARP reply that is generated in response to an ARP request sent to the priority IP address. However, in other embodiments, the ARP logic 47 can select different MAC addresses to include in ARP replies generated in response to ARP requests at the network device 12 that have the initial IP address and the priority IP address as the destination address.

Figure 5:
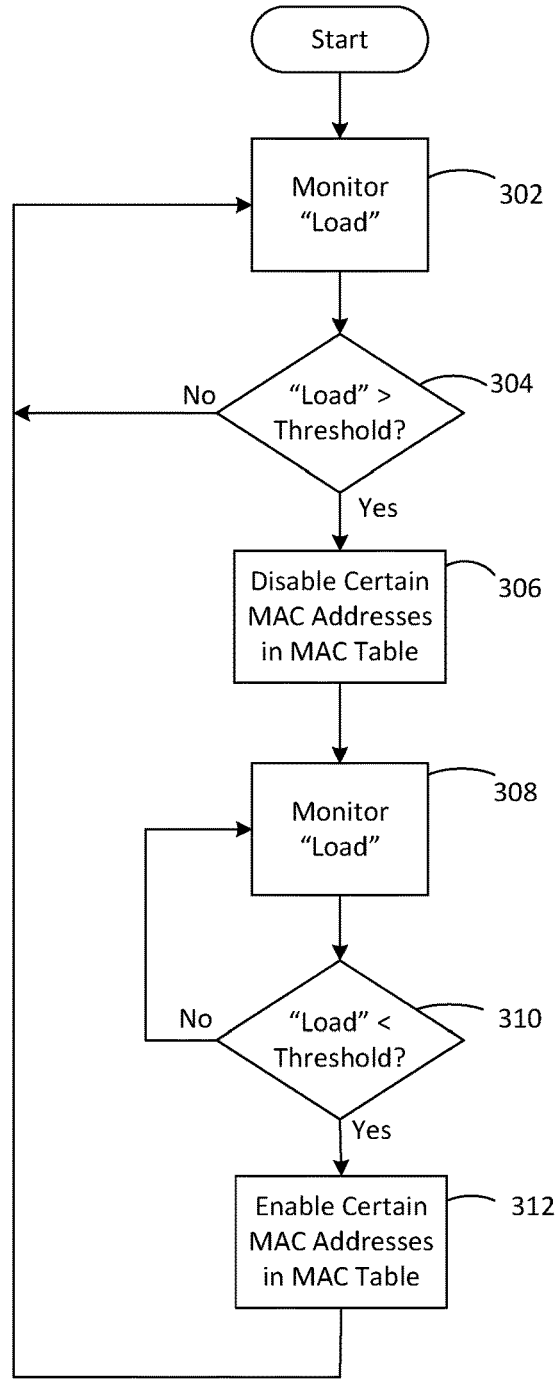
FIG. 5 shows an embodiment of a process for managing the MAC table of an Ethernet interface to prioritize packets.

FIG. 5 shows an embodiment of a process for prioritizing packets received by the network device 12. The process prioritizes the incoming packets to the network device 12 by controlling the packets that are recognized by the classifier 24 of the Ethernet interface 25 as a result of updates to the MAC addresses in the MAC table 20. If the MAC table 20 is updated to disable a MAC address, the corresponding packets that were provided (through the ARP process) with a disabled MAC address as a destination MAC address are assigned a lower priority and discarded by the classifier 24 because the destination MAC address of the packet is no longer present in the MAC table 20. In contrast, for the MAC addresses that remain in the MAC table, the corresponding packets that were provided (through the ARP process) with the remaining MAC address as a destination MAC address are assigned a higher priority and are provided to the processor 33 because the destination MAC address of the packet is still present in the MAC table 20.

The process begins with the processor 33, the Ethernet driver 44 and/or the congestion logic 45 monitoring conditions such as the "load" or congestion at the network device 12 (step 302). In one embodiment, the "load" at the network device 12 can correspond to one or more of CPU utilization, memory utilization or a load on a process. For example, the "load" can correspond to the number of packets received for processing within a specified time period or the number of packets being buffered for processing by the processor 33. However, in other embodiments, other parameters can be used to determine the "load" on the network device 12. The "load" on the network device 12 is then compared to a threshold corresponding to the "load" (step 304) by the congestion logic 45. If the "load" is less than the threshold, then the process returns to step 302 to continue monitoring the "load" of the network device 12. However, if the "load" does exceed the threshold, then the congestion logic 45, instructs the Ethernet driver 44 to disable one or more MAC addresses in the MAC table 20 (step 306). In one embodiment, the Ethernet driver 44 can disable the MAC addresses (e.g., the factory MAC address) associated with the lowest priority packets being received by the network device 12, thereby preventing those packets from being processed by the processor 33 because the classifier 24 will discard or drop the packets during the classification process. The classifier 24 will discard the packets because the destination MAC address of the packets is no longer identifiable in the MAC table 20.

The process continues with the processor 33, the Ethernet driver 44 and/or the congestion logic 45 monitoring the "load" or congestion at the network device 12 (step 308). The "load" of the network device 12 is monitored again to determine if the blocking of some packets has reduced the "load" on the network device. The "load" on the network device 12 is then compared to a threshold corresponding to the "load" (step 310) by the congestion logic 45. If the "load" is greater than the threshold, then the process returns to step 308 to continue monitoring the "load" of the network device 12. However, if the "load" is below the threshold, then the congestion logic 45, instructs the Ethernet driver 44 to enable the one or more MAC addresses in the MAC table 20 (step 312) that were disabled in step 306. After, the MAC addresses have been enabled, the process returns to step 302 to resume monitoring the "load" of the network device 12. In one embodiment, the threshold used for step 310 can be the same the threshold used for step 304. However, in other embodiments, the threshold used for step 310 can be greater than or less than the threshold used for step 304.

In another embodiment, the MAC addresses in the MAC table 20 can be grouped into multiple categories corresponding to different priority levels of incoming packets to the network device 12. The congestion logic 45 can instruct the Ethernet driver 44 to disable categories of MAC addresses from the MAC table 20 corresponding to the lowest priority packets depending on the "load" on the network device 12. If the "load" on the network device 12 is not reduced by disabling some categories of MAC addresses, the congestion logic 45 can instruct the Ethernet driver 44 to disable additional categories of MAC addresses from the MAC table 20 corresponding to the next lowest priority of packets. The process of disabling categories of MAC addresses from the MAC table 20 can continue until the "load" on the network device 12 returns to an acceptable level. The disabled MAC addresses can then be enabled in the MAC table in the reverse order in which they were disabled as long as the "load" on the network device 12 remains acceptable. In other words, the categories of MAC addresses associated with the higher priority packets are enabled in the MAC table before the categories of MAC addresses associated with the lower priority packets.

In still another embodiment, the decision to disable MAC addresses from the MAC table 20 can be made for reasons other than the "load" on the network device 12. For example, the congestion logic 45 may have a particular MAC address disabled from the MAC table if the packets being sent to that MAC address are corrupted or malformed or if attack vectors are detected.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A network device comprising:
a processor;
an interface communicatively coupled to the processor, the interface configured to connect to a network to receive data packets transmitted over the network, wherein each data packet received at the interface has a destination address, the interface comprising a table storing a plurality of addresses, wherein the interface is configured to provide data packets to the processor in response to the destination address of the received data packet matching one address of the plurality of addresses stored in the table;
the plurality of addresses including a first address and a second address, the processor configured to provide the first address to a first remote device in response to a request from the first remote device for requesting an address identifying the network device and to provide the second address to a second remote device in response to a request from the second remote device for requesting an address identifying the network device, thereby enabling the network device to prioritize, based on the first address and the second address, data packets from the first remote device relative to data packets from the second remote device; and wherein the processor is configured to monitor a condition of the network device, the processor configured to disable the first address in the table in response to the monitored condition exceeding a predetermined threshold, and wherein the interface is configured to drop data packets having the first address as the destination address in response to the processor disabling the first address in the table.

2. The network device of claim 1, wherein the processor is configured to enable the first address in the table in response to the monitored condition being below the predetermined threshold, and wherein the interface is configured to provide data packets having the first address as the destination address to the processor in response to the processor enabling the first address in the table.

3. The network device of claim 1, wherein the condition of the network device monitored by the processor includes at least one of central processing unit utilization, memory utilization, or a load on a process.

4. The network device of claim 1, wherein the plurality of addresses stored in the table are a plurality of media access control (MAC) addresses and the destination address in the data packet is a destination MAC address.

5. The network device of claim 4, wherein the first address is a first MAC address associated with a first data packet sent by the first remote device and the second address is a second MAC address associated with a second data packet sent by the second remote device, the second data packet having a higher priority than the first data packet.

6. The network device of claim 5, wherein the processor is configured to provide the first MAC address in an address resolution protocol (ARP) reply message in response to an ARP request message by the first remote device.

7. The network device of claim 1, further comprising an ingress queue to receive data packets from the interface and provide data packets to the processor.

8. The network device of claim 1, wherein the interface comprises a classifier, the classifier configured to extract the destination address from the received data packet and compare the extracted destination address to each address of the plurality of addresses stored in the table.

9. The network device of claim 1, further comprising a queue for queuing data packets to be processed by the processor, wherein the interface is configured to forward to the queue at least one data packet from the first remote device in response to a destination address of the at least one data packet from the first remote device matching the first address stored in the table, and wherein the interface is configured to forward to the queue at least one data packet from the second remote device in response to a destination address of the at least one data packet from the second remote device matching the second address stored in the table.

10. A method for prioritizing data packets received by a network device, the method comprising:
    storing a plurality of addresses in a table, the plurality of addresses including a first address and a second address;
    providing the first address to a first remote device in response to a request from the first remote device for requesting an address identifying the network device;
    providing the second address to a second remote device in response to a request from the second remote device for requesting an address identifying the network device;
    receiving a data packet at the network device, the data packet having a destination address;
    comparing the destination address of the data packet to the plurality of addresses stored in the table;
    providing the data packet to a processor in response to the destination address of the data packet matching one address of the plurality of addresses stored in the table;
    monitoring a condition of the network device; and
    preventing received data packets having the first address as a destination address from being provided to the processor in response to the monitored condition exceeding a threshold.

11. The method of claim 10, further comprising permitting received data packets having the first address as the destination address to be provided to the processor in response to the monitored condition being below a threshold.

12. The method of claim 11, wherein the preventing received data packets includes disabling the first address in the table.

13. The method of claim 12, wherein the permitting received data packets includes enabling the first address in the table.

14. The method of claim 10, wherein the monitoring a condition includes monitoring at least one of central processing unit utilization, memory utilization, or a load on a process.

15. The method of claim 10, wherein the plurality of addresses stored in the table are a plurality of media access control (MAC) addresses and the destination address in the data packet is a destination MAC address.

16. The method of claim 10, wherein the providing the second address includes providing the second address to the second remote device in an address resolution protocol (ARP) reply message in response to an ARP request message sent by the second remote device.

17. The method of claim 16, further comprising:
    mapping a first Internet protocol (IP) address to the first address and a second IP address to the second address; and
    the providing the second address to the second remote device includes receiving the ARP request message at the network device, the ARP request message including the second IP address.

18. The method of claim 10, further comprising:
    forwarding to a queue for queuing data packets to be processed by the processor at least one data packet from the first remote device in response to a destination address of the at least one data packet from the first remote device matching the first address stored in the table; and
    forwarding to the queue at least one data packet from the second remote device in response to a destination address of the at least one data packet from the second remote device matching the second address stored in the table.

19. A network device comprising:
    at least one processor; and
    an Ethernet interface coupled to the at least one processor and configured to receive data packets from at least one network connection coupled to the Ethernet interface, the Ethernet interface having a table for storing media access control (MAC) addresses including at least a first MAC address for identifying the network device and a second MAC address for identifying the network device, the Ethernet interface having a classifier configured to compare destination addresses in the data packets to the MAC addresses in the table for determining whether to queue the data packets for processing by the at least one processor, wherein the Ethernet interface is configured to receive a first request from a first device for requesting a MAC address of the network device and a second request from a second device for requesting a MAC address of the network device, wherein the at least one processor is configured to respond to the first request by controlling the Ethernet interface to transmit to the first device a first reply that includes the first MAC address, and wherein the at least one processor is configured to respond to the second request by controlling the Ethernet interface to transmit to the second device a second reply that includes the second MAC address thereby enabling the at least one processor to prioritize data packets from the first device relative to data packets from the second device based on the first and second MAC addresses.

20. The network device of claim 19, wherein the at least one processor is configured to disable the first MAC address from the table in response to a detection of a condition such that data packets from the second device are prioritized over data packets from the first device.

21. The network device of claim 19, further comprising a queue for queuing data packets to be processed by the processor, wherein the Ethernet interface is configured to forward to the queue at least one data packet from the first device in response to a destination address of the at least one data packet from the first device matching the first address stored in the table, and wherein the interface is configured to forward to the queue at least one data packet from the second device in response to a destination address of the at least one data packet from the second device matching the second address stored in the table.

22. A method for prioritizing data packets received by a network device, the method comprising:

receiving a plurality of data packets from a network at the network device;

storing, in memory of the network device, a table having a plurality of addresses, including a first address for identifying the network device and a second address for identifying the network device;

comparing destination addresses in the plurality of data packets to the plurality of addresses in the table;

determining based on the comparing whether to forward the plurality of data packets to a queue for queuing data packets to be processed by a processor of the network device;

receiving at the network device a first request from a first device for requesting an address of the network device;

receiving at the network device a second request from a second device for requesting an address of the network device;

transmitting from the network device to the first device a first reply to the first request, the first reply including the first address;

transmitting from the network device to the second device a second reply to the second request, the second reply including the second address;

transmitting at least one data packet from the first device to the queue in response to a determination that a destination address in the at least one data packet from the first device matches the first address stored in the table;

transmitting at least one data packet from the second device to the queue in response to a determination that a destination address in the at least one data packet from the second device matches the second address stored in the table;

prioritizing traffic from the second device relative to traffic from the first device by disabling the first address in the table; and dropping at least one data packet from the first device in response to the disabling.

23. The method of claim 22, wherein the first address is a media access control (MAC) address, and wherein the second address is a MAC address.

* * * * *